US006792004B1

(12) United States Patent
Davis et al.

(10) Patent No.: US 6,792,004 B1
(45) Date of Patent: Sep. 14, 2004

(54) SYSTEMS, METHODS AND COMPUTER PROGRAM PRODUCTS FOR AVERAGING LEARNED LEVELS IN THE PRESENCE OF ROBBED-BIT SIGNALING BASED ON PROXIMITY

(75) Inventors: Gordon Taylor Davis, Chapel Hill, NC (US); Malcolm Scott Ware, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/430,603

(22) Filed: Oct. 29, 1999

(51) Int. Cl.[7] .............................................. H04J 13/00
(52) U.S. Cl. ........................ 370/479; 370/523; 375/222
(58) Field of Search ................................. 370/523, 525, 370/526, 524, 479, 252, 522, 458, 466, 467; 375/222, 220, 285, 326, 233, 242; 708/323, 229, 230

(56) References Cited

U.S. PATENT DOCUMENTS

| | | | |
|---|---|---|---|
| 3,557,308 A | 1/1971 | Alexander et al. | 178/69.5 |
| 3,622,877 A | 11/1971 | MacDavid et al. | 324/73 R |
| 3,683,120 A | 8/1972 | Schenkel | 179/15 A |
| 3,729,717 A | 4/1973 | de Koe et al. | 340/172.5 |
| 4,112,427 A | 9/1978 | Hofer et al. | 340/347 |
| 4,132,242 A | 1/1979 | Carroll, Jr. | 137/263 |
| 4,208,630 A | 6/1980 | Martinez | 375/7 |
| 4,237,552 A | 12/1980 | Aikoh et al. | 370/83 |
| 4,270,027 A | 5/1981 | Agrawal et al. | 179/81 R |
| 4,434,322 A | 2/1984 | Ferrell | 178/22.13 |
| 4,450,556 A | 5/1984 | Boleda et al. | 370/58 |
| 4,577,310 A | 3/1986 | Korsky et al. | 370/58 |
| 4,578,796 A | 3/1986 | Charalambous et al. | 375/8 |
| 4,720,861 A | 1/1988 | Bertrand | 381/36 |
| 4,731,816 A | 3/1988 | Hughes-Hartogs | 379/98 |
| 4,756,007 A | 7/1988 | Qureshi et al. | 375/37 |
| 4,760,598 A | 7/1988 | Ferrell | 380/44 |
| 4,797,898 A | 1/1989 | Martinez | 375/7 |
| 4,833,706 A | 5/1989 | Hughes-Hartogs | 379/98 |
| 4,868,863 A | 9/1989 | Hartley et al. | 379/98 |

(List continued on next page.)

FOREIGN PATENT DOCUMENTS

FR     2 345 019     3/1976     ........... H04L/27/10

OTHER PUBLICATIONS

Erup, et al., Interpolation in Digital Modems—Part II: Implementation and Performance, *IEEE Transactions on Communications*, vol. 41, No. 6, pp. 998–1009 (Jun. 1993).

(List continued on next page.)

*Primary Examiner*—Chi Pham
*Assistant Examiner*—Alexander O. Boakye
(74) *Attorney, Agent, or Firm*—Scott W. Reid; Myers Bigel Sibley & Sajovec, P.A.

(57) ABSTRACT

Methods, systems and computer program products for averaging measured levels from differing intervals and differing code points based on their proximity with other measured levels are provided. Such proximity averaging may be provided by methods, systems and computer program products for averaging measured levels of code point sequences from a plurality of frame intervals in the presence of robbed-bit signaling by comparing a first measured level of a first code point from a first of the plurality of frame intervals and a measured level of a second code point from the plurality of frame intervals so as to provide a first comparison result. The measured level of the second code point is incorporated into an average of the measured levels for the first code point from the plurality of frame intervals based on the first comparison result and a threshold value. The measured level of the second code point may then be replaced with the average of the measured levels of the first code points if the measured level of the second code point is incorporated into the average of the measured levels of the first code point. Preferably, the first and second code points are adjacent code points in the code point sequence.

52 Claims, 4 Drawing Sheets

U.S. PATENT DOCUMENTS

| | | | |
|---|---|---|---|
| 4,884,285 A | 11/1989 | Heynen et al. | 375/25 |
| 4,890,303 A | 12/1989 | Bader | 375/107 |
| 4,890,316 A | 12/1989 | Walsh et al. | 379/98 |
| 4,894,847 A | 1/1990 | Tjahjadi et al. | 375/121 |
| 4,901,333 A | 2/1990 | Hodgkiss | 375/98 |
| 4,943,980 A | 7/1990 | Dobson et al. | 375/42 |
| 4,953,210 A | 8/1990 | McGlynn et al. | 380/48 |
| 4,967,413 A | 10/1990 | Otani | 371/37.4 |
| 4,972,360 A | 11/1990 | Cuckier et al. | 364/724.04 |
| 4,985,902 A | 1/1991 | Gurcan | 375/14 |
| 4,991,169 A | 2/1991 | Davis et al. | 370/77 |
| 4,995,030 A | 2/1991 | Helf | 370/32.1 |
| 5,005,144 A | 4/1991 | Nakajima et al. | 364/565 |
| 5,007,047 A | 4/1991 | Sridhar et al. | 370/32.1 |
| 5,014,299 A | 5/1991 | Klupt et al. | 379/98 |
| 5,033,062 A | 7/1991 | Morrow et al. | 375/7 |
| 5,038,365 A | 8/1991 | Belloc et al. | 375/8 |
| 5,040,190 A | 8/1991 | Smith et al. | 375/4 |
| 5,052,000 A | 9/1991 | Wang et al. | 371/43 |
| 5,058,134 A | 10/1991 | Chevillat et al. | 375/39 |
| 5,065,410 A | 11/1991 | Yoshida et al. | 375/98 |
| 5,067,125 A | 11/1991 | Tsuchida | 370/79 |
| 5,068,875 A | 11/1991 | Quintin | 375/78 |
| 5,107,520 A | 4/1992 | Karam et al. | 375/60 |
| 5,111,481 A | 5/1992 | Chen et al. | 375/14 |
| 5,119,401 A | 6/1992 | Tsujimoto | 375/14 |
| 5,119,403 A | 6/1992 | Krishnan | 375/39 |
| 5,134,611 A | 7/1992 | Steinka et al. | 370/79 |
| 5,142,552 A | 8/1992 | Tzeng et al. | 375/14 |
| 5,157,690 A | 10/1992 | Buttle | 375/14 |
| 5,187,732 A | 2/1993 | Suzuki | 379/5 |
| 5,210,755 A | 5/1993 | Nagler et al. | 370/108 |
| 5,225,997 A | 7/1993 | Lederer et al. | 364/550 |
| 5,253,272 A | 10/1993 | Jaeger et al. | 375/60 |
| 5,253,291 A | 10/1993 | Naseer et al. | 379/406 |
| 5,265,151 A | 11/1993 | Goldstein | 379/97 |
| 5,285,474 A | 2/1994 | Chow et al. | 375/13 |
| 5,291,479 A | 3/1994 | Vaziri et al. | 370/58.2 |
| 5,311,578 A | 5/1994 | Bremer et al. | 379/97 |
| 5,317,594 A | 5/1994 | Goldstein | 375/8 |
| 5,351,134 A | 9/1994 | Yaguchi et al. | 358/435 |
| 5,353,280 A | 10/1994 | Ungerböck | 370/32.1 |
| 5,386,438 A | 1/1995 | England | 375/121 |
| 5,394,110 A | 2/1995 | Mizoguchi | 329/304 |
| 5,394,437 A | 2/1995 | Ayanoglu et al. | 375/222 |
| 5,398,303 A | 3/1995 | Tanaka | 706/45 |
| 5,402,445 A | 3/1995 | Matsuura | 375/229 |
| 5,406,583 A | 4/1995 | Dagdeviren | 375/5 |
| 5,418,842 A | 5/1995 | Cooper | 379/98 |
| 5,432,794 A | 7/1995 | Yaguchi | 371/5.5 |
| 5,434,884 A | 7/1995 | Rushing et al. | 375/235 |
| 5,475,711 A | 12/1995 | Betts et al. | 375/240 |
| 5,491,720 A | 2/1996 | Davis et al. | 375/222 |
| 5,513,216 A | 4/1996 | Gadot et al. | 375/233 |
| 5,519,703 A | 5/1996 | Chauffour et al. | 370/84 |
| 5,528,625 A | 6/1996 | Ayanoglu et al. | 375/222 |
| 5,528,679 A | 6/1996 | Taarud | 379/34 |
| 5,533,048 A | 7/1996 | Dolan | 375/222 |
| 5,534,913 A | 7/1996 | Majeti et al. | 348/7 |
| 5,546,395 A | 8/1996 | Sharma et al. | 370/84 |
| 5,563,908 A | 10/1996 | Kaku et al. | 375/222 |
| 5,566,211 A | 10/1996 | Choi | 375/332 |
| 5,598,401 A | 1/1997 | Blackwell et al. | 379/94 |
| 5,625,643 A | 4/1997 | Kaku et al. | 375/222 |
| 5,634,022 A | 5/1997 | Crouse et al. | 717/130 |
| 5,640,387 A | 6/1997 | Takahashi et al. | 370/359 |
| 5,646,958 A | 7/1997 | Tsujimoto | 375/233 |
| 5,671,250 A | 9/1997 | Bremer et al. | 375/222 |
| 5,694,420 A | 12/1997 | Ohki et al. | 375/222 |
| 5,710,792 A | 1/1998 | Fukawa et al. | 375/229 |
| 5,724,393 A | 3/1998 | Dagdeviren | 375/296 |
| 5,726,765 A | 3/1998 | Yoshida et al. | 358/412 |
| 5,729,226 A | 3/1998 | Betts et al. | 341/94 |
| 5,732,104 A | 3/1998 | Brown et al. | 375/222 |
| 5,734,663 A | 3/1998 | Eggenberger | 371/39.1 |
| 5,751,717 A | 5/1998 | Babu et al. | 370/466 |
| 5,751,796 A | 5/1998 | Scott et al. | 379/93.32 |
| 5,754,594 A | 5/1998 | Betts et al. | 375/285 |
| 5,757,849 A | 5/1998 | Gelblum et al. | 375/222 |
| 5,757,865 A | 5/1998 | Kaku et al. | 375/344 |
| 5,761,247 A | 6/1998 | Betts et al. | 375/316 |
| 5,768,311 A | 6/1998 | Betts et al. | 375/222 |
| 5,778,024 A | 7/1998 | McDonough | 375/216 |
| 5,784,377 A | 7/1998 | Baydar et al. | 370/463 |
| 5,784,405 A | 7/1998 | Betts et al. | 375/222 |
| 5,784,415 A | 7/1998 | Chevillat et al. | 375/341 |
| 5,793,809 A | 8/1998 | Holmquist | 375/242 |
| 5,796,808 A | 8/1998 | Scott et al. | 379/93.31 |
| 5,801,695 A | 9/1998 | Townshend | 375/340 |
| 5,805,669 A | 9/1998 | Bingel et al. | 379/28 |
| 5,809,075 A | 9/1998 | Townshend | 375/254 |
| 5,812,537 A | 9/1998 | Betts et al. | 370/286 |
| 5,815,534 A | 9/1998 | Glass | 375/326 |
| 5,822,371 A | 10/1998 | Goldstein et al. | 375/242 |
| 5,825,816 A | 10/1998 | Cole et al. | 375/222 |
| 5,825,823 A | 10/1998 | Goldstein et al. | 375/286 |
| 5,831,561 A | 11/1998 | Cai et al. | 341/106 |
| 5,835,532 A | 11/1998 | Strolle et al. | 375/233 |
| 5,835,538 A | 11/1998 | Townshend | 375/295 |
| 5,838,724 A | 11/1998 | Cole et al. | 375/222 |
| 5,839,053 A | 11/1998 | Bosch et al. | 455/13.1 |
| 5,844,940 A | 12/1998 | Goodson et al. | 375/222 |
| 5,850,388 A | 12/1998 | Anderson et al. | 370/252 |
| 5,850,421 A | 12/1998 | Misra et al. | 375/354 |
| 5,852,631 A | 12/1998 | Scott | 375/222 |
| 5,862,141 A | 1/1999 | Trotter | 370/468 |
| 5,862,179 A | 1/1999 | Goldstein et al. | 375/242 |
| 5,862,184 A | 1/1999 | Goldstein et al. | 375/295 |
| 5,870,429 A | 2/1999 | Moran, III et al. | 375/222 |
| 5,872,817 A | 2/1999 | Wei | 375/341 |
| 5,881,066 A | 3/1999 | Lepitre | 371/20.5 |
| 5,881,102 A | 3/1999 | Samson | 375/222 |
| 5,887,027 A | 3/1999 | Cohen et al. | 375/222 |
| 5,911,115 A | 6/1999 | Nair et al. | 455/63 |
| 5,914,982 A | 6/1999 | Bjarnason et al. | 375/222 |
| 5,918,204 A | 6/1999 | Tsurumaru | 704/214 |
| 5,926,506 A | 7/1999 | Berthold et al. | 375/222 |
| 6,115,395 A * | 9/2000 | Norrell et al. | 370/523 |
| 6,185,249 B1 * | 2/2001 | Drucker et al. | 375/222 |
| 6,487,243 B1 * | 11/2002 | Hwang et al. | 375/222 |

OTHER PUBLICATIONS

Fischer, Signal Mapping for PCM Modems, *V–pcm Rapporteur Meeting,* Sunriver, Oregon, USA,, 5 pgs. (Sep. 4–12, 1997).

Gardner, Interpolation in Digital Modems—Part I: Fundamentals, *IEEE Transactions on Communications,* vol. 41, No. 3, pp. 501–507 (Mar. 1993).

Humblet et al., The Information Driveway, *IEEE Communications Magazine,* pp. 64–68 (Dec. 1996).

Kalet et al., The Capacity of PCM Voiceband Channels, *IEEE International Conference on Communications '93,* pp. 507–511 (Geneva,, Switzerland, May 23–26, 1993).

Mueller et al., Timing Recovery in Digital Synchronous Data Receiver, *IEEE Transactions on Communications,* vol. Com–24, No. 5, pp. 516–531 (May 1976).

Okubo et al., Building Block Design of Large Capacity PCM–TDMA Subscriber System and Direct Digital Interface to Digital Exchange, Japan Radio Co., Ltd., pp. 69–73 (Japan).

Pahlavan et al., Nonlinear Quantization and the Design of Coded and Uncoded Signal Constellations, *IEEE Transactions on Communications*, vol. 39, No. 8, pp. 1207–1215 (Aug. 1991).

Proakis, Digital Signaling Over a Channel with Intersymbol Interference, *Digital Communications*, pp. 373, 381 (McGraw–Hill Book Company, 1983).

Williams et al., Counteracting the Quantisation Noise from PCM Codecs, BT Laboratories, pp. 24–29 (UK).

A Digital Modem and Analogue Modem Pair for Use on the Public Switched Telephone Network (PSTN) at Data Signalling Rates of Up to 56 000 Bit/s Downstream and 33 600 Bit/s Upstream, *ITU–T V.90* (Sep. 1998).

Series V: Data Communication Over the Telephone Network; Interfaces and voiceband modems: A modem operating at data signalling rates of up to 33 600 bit/s for use on the general switched telephone network and on leased point–to–point 2–wire telephone type circuits, *ITU–T V.34* (10/96).

Bell, R.A., et al., Automatic Speed Reduction and Switched Network Back–up, *IBM Technical Disclosure Bulletin*, vol. 32, No. 1, pp. 154–157 (Jun. 1989).

Abbiate, J.C., et al., Variable–Data Transmission Modem, *IBM Technical Disclosure Bulletin*, vol. 17, No. 11, pp. 3301–3302 (Apr. 1975).

Data Communication Over the Telephone Network; Procedures for Starting Sessions of Data Transmission Over the General Switched Telephone Network, *ITU–T V.8* (09/94).

Line Quality Monitoring Method, *IBM Technical Disclosure Bulletin*, vol. 18, No. 8, pp. 2726–2726 (Jan. 1976).

Loopback Tests for V.54 Data Communication Equipment, *IBM Technical Disclosure Bulletin*, vol. 32, No. 3A, pp. 295–299 (Aug. 1989).

On–Line Real Time Modem Testing, *IBM Technical Disclosure Bulletin*, vol. 20, No. 6, pp. 2252–2254 (Nov. 1977).

Pierobon, Gianfranco L., Codes of Zero Spectral Density at Zero Frequency, *IEEE Transactions on Information Theory*, vol. IT–30, No. 2, pp. 435–439 Mar., 1984).

Marcus, Brian H, et al., On Codes with Spectral Nulls at Rational Submultiples of the Symbol Frequency, *IEEE Transactions on Information Theory*, vol. IT–33, No. 4, pp. 557–568 (Jul. 1987).

Fischer, Robert, et al., Signal Mapping for PCM Modems, *ITU–Telecommunications Standardization Sector PCM '97–120, V.pcm Rapporteur Meeting*, (Sunriver, Oregon; Sep. 4–12, 1997).

Pulse Code Modulation (PCM) of Voice Frequencies, *ITU–T*, Recommendation G.711 (Geneva, 1972).

Series G: Digital Transmission Systems; Terminal equipments—Coding of analogue signals by pulse code modulation; Pulse code modulation (PCM) of voice frequencies, *ITU–T*, Recommendation G.711 (Geneva, 1996).

Data Communication Over the Telephone Network; Error––Correcting Procedures for DCEs Using Asynchronous–to––Synchronous Conversion, *ITU–T V.42* (Mar. 1993).

Improvement to Spectral Shaping Technique, *Research Disclosure*, V. 41, n415,415111, pp. 1550–1551 (Nov. 1998).

TIA Standard Draft: North American Telephone Network Transmission Model for Evaluating Analog Client to Digitally Connected Server Modems, Telecommunications Industry Association, PN3857,Draft 10 (Feb. 1999).

Davis, Gordon T., DSP and MATLAB implementation of model–based constellation generation (Sep. 18, 1998).

Woodruff, K.R, et al, Automatic and Adaptive System and Efficient Communication in Noisy Communication Line Environments, *IBM Technical Disclosure Bulletin*, vol. 24, No. 9, pp. 4627–4629 (Feb. 1982).

Godard, D., et al., Decision Feedback Equalizer Stabilization in Adaptive Mode, *IBM Technical Disclosure Bulletin*, vol. 24, No. 11A, pp. 5691–5692 (Apr. 1982).

Borgnis–Desbordes, P., et al., Variable–Speed Data Transmission, *IBM Technical Disclosure Bulletin*, vol. 27, No. 4A, pp. 2269–2270 (Sep. 1984).

Couland, G., et al., Analog Wrap Self–Test in Modems During Retrain Operations, *IBM Technical Disclosure Bulletin*, vol. 28, No. 6, p. 2457 (Nov. 1985).

Maddens, F., Sixteen–State Forward Convolutional Encoder, *IBM Technical Disclosure Bulletin*, vol. 28, No. 6, pp. 2466–2468 (Nov. 1985).

Remote Modem–Type Self–Learning, *IBM Technical Disclosure Bulletin*, vol. 28, No. 6, pp. 2398–2399 (Nov. 1985).

Maddens, F., Sixteen–State Feedback Convolutional Encoder, *IBM Technical Disclosure Bulletin*, vol. 28, No. 10, pp. 4212–4213 (Mar. 1986).

Bell, R. A., et al., Automatic Speed Reduction and Switched Network Back–up, *IBM Technical Disclosure Bulletin*, vol. 32, No. 1, pp. 154–157 (Jun. 1989).

Nobakht, R.A., Trellis–Coded Modulation Coding Scheme for 19/2 Kbps Modem, *IBM Technical Disclosure Bulletin*, vol. 36, No. 11, pp. 167–170 (Nov. 1993).

Nobakht, R.A., Unified Table Based Subset Decoder for the Viterbi Algorithm, *IBM Technical Disclosure Bulletin*, vol. 37, No. 09, pp. 581–587 (Sep. 1994).

Nobakht, R.A., Trellis Subset Decoder Algorithm Based on a Pattern Recognition Scheme, *IBM Technical Disclosure Bulletin*, vol. 37, No. 10, pp. 693–697 (Oct. 1994).

Abbiate, J.C., et al., Variable–Data Transmission Modem, *IBM Technical Disclosure Bulletin*, vol. 17, No. 11, pp. 3301–3302 (Apr. 1975).

Bartlet, J., et al., Full Speed Recovery in High Speed Modems, *IBM Technical Disclosure Bulletin*, vol. 23, No. 2, pp. 641–643 (Jul. 1980).

Dialog Abstract, Sample rate converter for duplex modem, European Patent No. 285413.

Dialog Abstract, Two–speed full–duplex modem for telephone network, PCT. No. WO 8501407.

Dialog Abstract, Digital data transmission system, European Patent No. 124674.

Dialog Abstract, Facsimile communication controller, Japanese Publication No. 04–175060 (Jun. 23, 1992).

Dialog Abstract, Picture communication equipment, Japanese Publication No. 03–120954 (May 23, 1991).

Dialog Abstract, Radio date transmission system, Japanese Publication No. 01–179535 (Jul. 17, 1989).

Dialog Abstract, Facsimile device, Japanese Patent Publication No. 57–164654 (Oct. 9, 1982).

Dialog Abstract, Data repeater, Japanese Publication No. 57–087255 (May 31, 1982).

Dialog Abstract, Blinding training method for decision feedback equaliser having feed–forward and feedback filters, European Patent No. 880253.

Dialog Abstract, Processing method for distorted signal received by qam receiver, European Patent No. 465851.

Dialog Abstract, Establishing wireless communication channel, PCT No. WO 9905820.

Dialog Abstract, High–speed rate adaptive subscriber line digital data modem, PCT No. WO 9830001.

Dialog Abstract, Digital modem in digital modulation system, Japanese Patent No. 8116341.

Dialog Abstract, Communication equipment and radio communication adapter, Japanese Publication No. 08–340289 (Dec. 24, 1996).

Dialog Abstract, Data recording method, Japanese Patent Publication No. 05–089597 (Apr. 9, 1993).

Dialog Abstract, Transmission control system for data communication and its modem equipment, Japanese Publication No. 02–228853 (Sep. 11, 1990).

Naguib, A.F., et al., Dialog Abstract, A space–time coding modem for high–data–rate wireless communications, *IEEE Journal of Selected Areas in Communications,* vol. 16, No. 8, pp. 1459–1478 (Oct. 1998).

Denno, S., et al., Dialog Abstract, Mbit/s burst modem with an adaptive equalizer for TDMA mobile radio communications, *IEICE Transactions on Communications,* vol. E81–B, No. 7, pp. 1453–1461 (Jul. 1998).

Naguib, A.F., et al., Dialog Abstract, A space–time coding modem for high–data–rate wireless communications, *GLOBECOM 97, IEEE Global Telecommunications Conference,* vol. 1, pp. 102–109 (1997).

Kobayashi, K., et al., Dialog Abstract, Fully digital burst modem for satellite multimedia communication systems, *IEICE Transactions on Communications,* vol. E80–B, No. 1, pp. 8–15 (Jan. 1997).

Skellern, D.J., et al., Dialog Abstract, A high speed wireless LAN, *IEEE Micro,* vol. 17, No. 1, pp. 40–47 (Jan.–Feb. 1997).

Enomoto, K., et al., Dialog Abstract, A mode switching type burst demodulator AFC, *Transactions of the Institute of Electronics, Information and Communication Engineers,* vol. J76B–II, No. 5, pp. 415–421 (May 1993).

Betts, W., Dialog Abstract, Nonlinear encoding by surface projection, *International Conference on Data Transmission—Advances in Modem and ISDN Technology and Applications* Sep. 23–25, 1992).

Schilling, D.L., et al., Dialog Abstract, The FAVR meteor burst communication experiment, *Military Communications in a Changing World MILCOM '91* (Nov. 4–7, 1991).

Jacobsmeyer, J.M., Dialog Abstract, Adaptive trellis–coded modulation for bandlimited meteor burst channels, *IEEE Journal on Selected Areas in Communications,* vol. 10, No. 3, pp. 550–561 (Apr. 1992).

Sato, T., et al., Dialog Abstract, Protocol configuration and verification of an adaptive error control scheme analog cellular networks, *IEEE Transactions on Vehicular Technology,* vol. 41, No. 1, pp. 69–76 (Feb. 1992).

Lee, L.–N., et al., Dialog Abstract, Digital signal processor––based programmable BPSK/QPSK/offset–QPSK modems, *COMSAT Technical Review,* pp. 195–234 (Fall 1989).

Sato, et al., Dialog Abstract, Error–free high–speed data modem, *Oki Technical Review,* vol. 56, No. 133 pp. 20–26 (Apr. 1989).

Seo, J.–S, et al., Dialog Abstract, Performance of convolutional coded SQAM in hardlimited satellite channels, *IEEE International Conference on Communications BostonICC/ 89,* vol. 2, pp. 787–791 (Jun. 11–14, 1989).

Murakama, K., et al. Dialog Abstract, FEC combined burst––modem for business satellite communications use, *IEEE/ IECE Global Telecommunications Conference 1987,* vol. 1, pp. 274–280 (Japan, Nov. 15–18, 1987).

McVerry, F., Dialog Abstract, Performance of a fast carrier recovery scheme for burst–format DQPSK transmission over satellite channels, *International Conference on Digital Processing Signals in Communications,* pp. 165–172 (United Kingdom, 1985).

Filter, J.H.J., Dialog Abstract, An algorithm for detecting loss of synchronisation in data transmission test sets (modems), *Transactions of the South African Institute of Electrical Engineers,* vol. 76, No. 1, pp. 39–43 (Jan. 1985).

Gersho, A., Dialog Abstract, Reduced complexity implementation of passband adaptive equalizers, *IEEE Journal on Selected Areas in Communications,* vol. SAC–2, No. 5, pp. 778–779 (Sep. 1984).

Dialog Abstract, High–speed full–duplex modem reduces telephone connect time, *EDN,* vol. 27, No. 18, p. 77 (Sep. 15, 1982).

Chadwick, H., et al., Dialog Abstract, Performance of a TDMA burst modem through a dual nonlinear satellite channel, *Fifth International Conference on Digital Satellite Communications,* pp. 63–67 (Italy, Mar. 23–26, 1981).

Nussbaumer, H., Dialog Abstract, Reducing the acquisition time in an automatic equalizer, *IBM Technical Disclosure Bulletin,* vol. 18, No. 5, pp. 1465–1479 (Oct. 1975).

Uzunoglu, V., et al., Dialog Abstract, Synchronous and the coherent phase–locked synchronous oscillators: new techniques in synchronization and tracking, *IEEE Transactions on Circuits and Systems,* vol. 36, No. 7, pp. 997–1004 (Jul. 1989).

Minei, I., et al., Dialog Abstract, High–speed Internet access through unidirectional geostationary satellite channels, *IEEE Journal on Selected Areas in Communications,* vol. 17, No. 2, pp. 345–359 (Feb. 1999).

Ovadia, S., Dialog Abstract, The effect of interleaver depth and QAM channel frequency offset on the performance of multichannel AM–VSB/256–QAM video lightwave transmission systems, *International Conference on Telecommunications: Bridging East and West Through Communications,* vol. 1, pp. 339–343 (Greece, Jun. 21–25, 1998).

Johnson, R. W., et al., Dialog Abstract, Error correction coding for serial–tone HG transmission, *Seventh International Conference on HF Radio Systems and Techniques,* pp. 80–84 (United Kingdom, Jul. 7–10, 1997).

Karasawa, Y., et al., Dialog Abstract, Cycle slip in clock recovery on frequency–selective fading channels, *IEEE Transactions on Communications,* vol. 45, No. 3, pp. 376–383 (Mar. 1997).

Umehira, M., et al., Dialog Abstract, Design and performance of burst carrier recovery using a phase compensated filter, *Transactions on the Institute of Electronics, Information and Communication Engineers,* vol. J78B–II, No. 12, pp. 735–746 (Dec. 1995).

De Bot, P., et al., Dialog Abstract, An example of a multi––resolution digital terrestrial TV modem, *Proceedings of ICC '93—IEEE International Conference on Communications,* vol. 3, pp. 1785–1790 (Switzerland, May 23–26, 1993).

Lei, Chen, et al., Dialog Abstract, Single–tone HF high speed data modem, *Proceedings of TENCON '93—IEEE Region 10 International Conference on Computers, Communications and Automation,* vol. 3, pp. 94–98 (China, Oct. 19–21, 1993).

Woerner, B.D., et al., Dialog Abstract, Simulation issues for future wireless modems, *IEEE Communications,* vol. 32, No. 7, pp. 42–53 (Jul. 1994).

Sato, T., et al., Dialog Abstract, Vehicle terminal equipment with dedicated DSP, *Oki Technical Review,* vol. 58, No. 144, pp. 49–52 (Jul. 1992).

Sato, T., et al., Dialog Abstract, Protocol configuration and verification of an adaptive error control scheme over analog cellular networks, *IEEE Transactions on Vehicular Technology,* vol. 41, No. 1, pp. 69–76 (Feb. 1992).

Tamm, Yu.A., Dialog Abstract, The effect of suppressing harmonic interference using an adaptive equalizer, *Elektrosvyaz,* vol. 45, No. 3, pp. 5–10, (Mar. 1990).

Saleh, A.A.M., et al., Dialog Abstract, An experimental TDMA indoor radio communication systemusing slow frequency hopping and coding, *IEEE Transactions on Communications,* vol. 39, No. 1, pp. 152–162 (Jan., 1991).

Nergis, A., Dialog Abstract, Optimum HF digital communication systems with block coding and interleaving techniques, *Proceedings of the 1990 Bilkent International Conference on New Trends in Communication, Control and Signal Processing,* vol. 1, pp. 511–517 (Turkey,. Jul. 2–5, 1990).

Kawamata, F., et al., Dialog Abstract, An evaluation of voice codecs and facsimiles, *Review of the Communication Research Laboratory,* vol. 36, pp. 69–73 (Mar. 1990).

Sato, T., et al., Dialog Abstract, Error–free high–speed data transmission simultaneously applicable to both wire and mobile radio channels, *38$^{th}$ IEEE Vehicular Technology Conference: 'Telecommunications Freedom—Technology on the Move',* pp. 489–496 (Jun. 15–17, 1988).

Dialog Abstract, 1200–bit/s cellular modem DLD03H, *Oki Technical Review,* vol. 53, No. 127, pp. 70–72 (Jul. 1987).

Chamberlain, J.W., et al., Dialog Abstract, Design and field test of a 256–QAM DIV modem, *IEEE Journal on Selected Areas in Communications,* vol. SAC–5, No. 3, pp. 349–356 (Apr. 1987).

De Cristofaro, R., et al., Dialog Abstract, A 120 Bv/s QPSK modem designed for the INTELSAT TDMA network, *International Journal of Satellite Communications,* vol. 3, Nos. 1–2, pp. 145–160 (Jan.–Jun., 1985).

Shumate, A., Dialog Abstract, Error correction coding for channels subject to occasional losses of bit count integrity, *IEEE Military Communications Conference,* vol. 1, pp. 89–83 (Oct. 21–24, 1984).

Suyderhoud, H., et al., Dialog Abstract, Investigation of 9.6 kb/s data transmission via a PCM link at 64 kb/s with and without link errors, *International Journal of Satellite Communications,* vol. 2, No. 1, pp. 81–87, (Jan.–Mar., 1984).

Smith, C., Dialog Abstract, Relating the performance of speech processors to the bit error rate, *Speech Technology,* vol.. 2, No. 1, pp. 41–53 (Sep.–Oct. 1983).

Suyderhoud, H., et al., Dialog Abstract, Investigation of 9.6–kbit/s data transmission via a PCM link at 64 kbit/s with and without link errors, *Sixth International Conference on Digital Satellite Communications Proceedings,* pp. 26–33 (Sep. 19, 23, 1983).

Kittel, L., Dialog Abstract, Analogue and discrete channel models for signal transmission in mobile radio, *Frequenz,,* vol. 36, Nos. 4–5, pp. 153–160 (Apr.–May 1982).

Farrell, P.G., et al., Dialog Abstract, Soft–decision error control of h.f. data transmission, *IEE Proceedings F (Communications, Radar and Signal Processing),* vol. 127, No. 5, pp. 389–400 (Oct. 1980).

Johnson, A.L., Dialog Abstract, Simulation and implementation of a modulation system for overcoming ionospheric scintillation fading, *AGARD Conference Proceedings No. 173 on Radio Systems and the Ionosphere,* pp. 3/1–5 (Greece, May 26–30, 1975).

Matsumura, K., et al., Dialog Abstract, Anti–interference data–transmission set of HF radio equipment, *Mitsublishi Electric Engineer,* No. 41, pp. 18–23 (Sep., 1974).

Blank, H.A., et al., Dialog Abstract, A Markov error channel model, *1973 National Telecommunications Conference,* vol. 1, pp. 15B/1–8 (Nov. 26–28, 1973).

McGruther, W.G., Dialog Abstract, Long term error performance data for operation at 2400 bps ona nonswitched private line network, *Summaries of papers presented at 1970 Canadian symposium on communications,* pp. 65–66 (Canada, Nov. 12–13, 1970).

Burton, H.O., et al., Dialog Abstract, On the use of error statistics from data transmission on telephone facilities to estimate performance of forward–error–correction, *1970 international conference on communications,* p. 21 (Jun. 8–10, 1970).

Bowen, R.R., Dialog Abstract, Application on burst error correction codes to data modems for dispersive channels, *Proceedings of the 1970 international symposium on information theory,* p. 1 (Netherlands, Jun. 15–19, 1970).

Pierce, A. W., et al., Dialog Abstract, Effective application of forward–acting error–control coding to multichannel h.f. data modems, *IEEE Transactions on Communication Technology,* vol. Com–18, No. 4, pp. 281–294 (Aug. 1970).

West, R.L., Abstract, Data Concentration Method, *IBM Technical Disclosure Bulletin,* pp. 487–489; http://w3.infogate.ibm.com: 1207/SESS506884/GETDOC/39/2/1 (Jul., 1975).

Haas, L.C., et al., Abstract, Received Line Signal Quality Analysis, *IBM Technical Disclosure Bulletin,* pp. 5414–5416; http://w3.infogate.ibm.com:1207/SESS506884/GETDOC/43/1/1 (May, 1981).

Nussbaumer, H., Abstract, Reducing the Acquisition Time in an Automatic Equalizer, *IBM Technical Disclosure Bulletin,* pp. 1465–1479; http://w3.infogate.ibm.com:1207/SESS506884/GETDOC/40/2/1 (Oct. 1975).

Dialog Abstract, Listener echo chanceller for digital communication system, PCT No. WO 9310607.

Dialog Abstract, Reduced time remote access method for modem computer, PCT No. WO 9209165.

\* cited by examiner

SYSTEMS, METHODS AND COMPUTER PROGRAM PRODUCTS FOR AVERAGING LEARNED LEVELS IN THE PRESENCE OF ROBBED-BIT SIGNALING BASED ON PROXIMITY

FIELD OF THE INVENTION

The present invention relates generally to the field of digital communications, and, more particularly, to the selection of code points for digital transmission of information.

BACKGROUND OF THE INVENTION

The demand for remote access to information sources and data retrieval, as evidenced by the success of services such as the World Wide Web, is a driving force for high-speed network access technologies. The public switched telephone network (PSTN) offers standard voice services over a 4 kHz bandwidth. Traditional analog modem standards generally assume that both ends of a modem communication session have an analog connection to the PSTN. Because data signals are typically converted from digital to analog when transmitted towards the PSTN and then from analog to digital when received from the PSTN, data rates may be limited to 33.6 kbps as defined in the V.34 Transmission Recommendation developed by the International Telecommunications Union (ITU).

The need for an analog modem may be eliminated, however, by using the basic rate interface (BRI) of the Integrated Services Digital Network (ISDN). A BRI offers end-to-end digital connectivity at an aggregate data rate of 160 kbps, which is comprised of two 64 kbps B channels, a 16 kbps D channel, and a separate maintenance channel. ISDN offers comfortable data rates for Internet access, telecommuting, remote education services, and some forms of video conferencing. ISDN deployment, however, has generally been very slow due to the substantial investment required of network providers for new equipment. Because the ISDN is not very pervasive in the PSTN, the network providers have typically tariffed ISDN services at relatively high rates, which may be ultimately passed on to the ISDN subscribers. In addition to the high service costs, subscribers must generally purchase or lease network termination equipment to access the ISDN.

While most subscribers do not enjoy end-to-end digital connectivity through the PSTN, the PSTN is nevertheless mostly digital. Typically, the only analog portion of the PSTN is the phone line or local loop that connects a subscriber or client modem (e.g., an individual subscriber in a home, office, or hotel) to the telephone company's central office (CO). Local telephone companies have been replacing portions of their original analog networks with digital switching equipment. Nevertheless, the connection between the home and the CO has been the slowest to change to digital as discussed in the foregoing with respect to ISDN BRI service. A recent data transmission recommendation issued by the ITU, known as V.90, takes advantage of the digital conversions that have been made in the PSTN. By viewing the PSTN as a digital network, V.90 technology can accelerate data downstream from the Internet or other information source to a subscriber's computer at data rates of up to 56 kbps, even when the subscriber is connected to the PSTN via an analog local loop.

To understand how the V.90 Recommendation achieves this higher data rate, it may be helpful to briefly review the operation of V.34 analog modems. V.34 modems are generally optimized for a configuration in which both ends of a communication session are connected to the PSTN by analog lines. Even though most of the PSTN is digital, V.34 modems treat the network as if it were entirely analog. Moreover, the V.34 Recommendation assumes that both ends of the communication session suffer impairment due to quantization noise introduced by analog-to-digital converters. That is, the analog signals transmitted from the V.34 modems are sampled at 8000 times per second by a codec upon reaching the PSTN with each sample being represented or quantized by an eight-bit pulse code modulation (PCM) codeword. The codec uses 256, non-uniformly spaced, PCM quantization levels defined according to either the $\mu$-law or A-law companding standard (i.e., the ITU G.711 Recommendation)

Because the analog waveforms are continuous and the binary PCM codewords are discrete, the digits that are sent across the PSTN can only approximate the original analog waveform. The difference between the original analog waveform and the reconstructed quantized waveform is called quantization noise, which limits the modem data rate.

While quantization noise may limit a V.34 communication session to 33.6 kbps, it nevertheless affects only analog-to-digital conversions. The V.90 standard relies on the lack of analog-to-digital conversions in the downstream path, outside of the conversion made at the subscriber's modem to enable transmission at 56 kbps.

Figure 1:
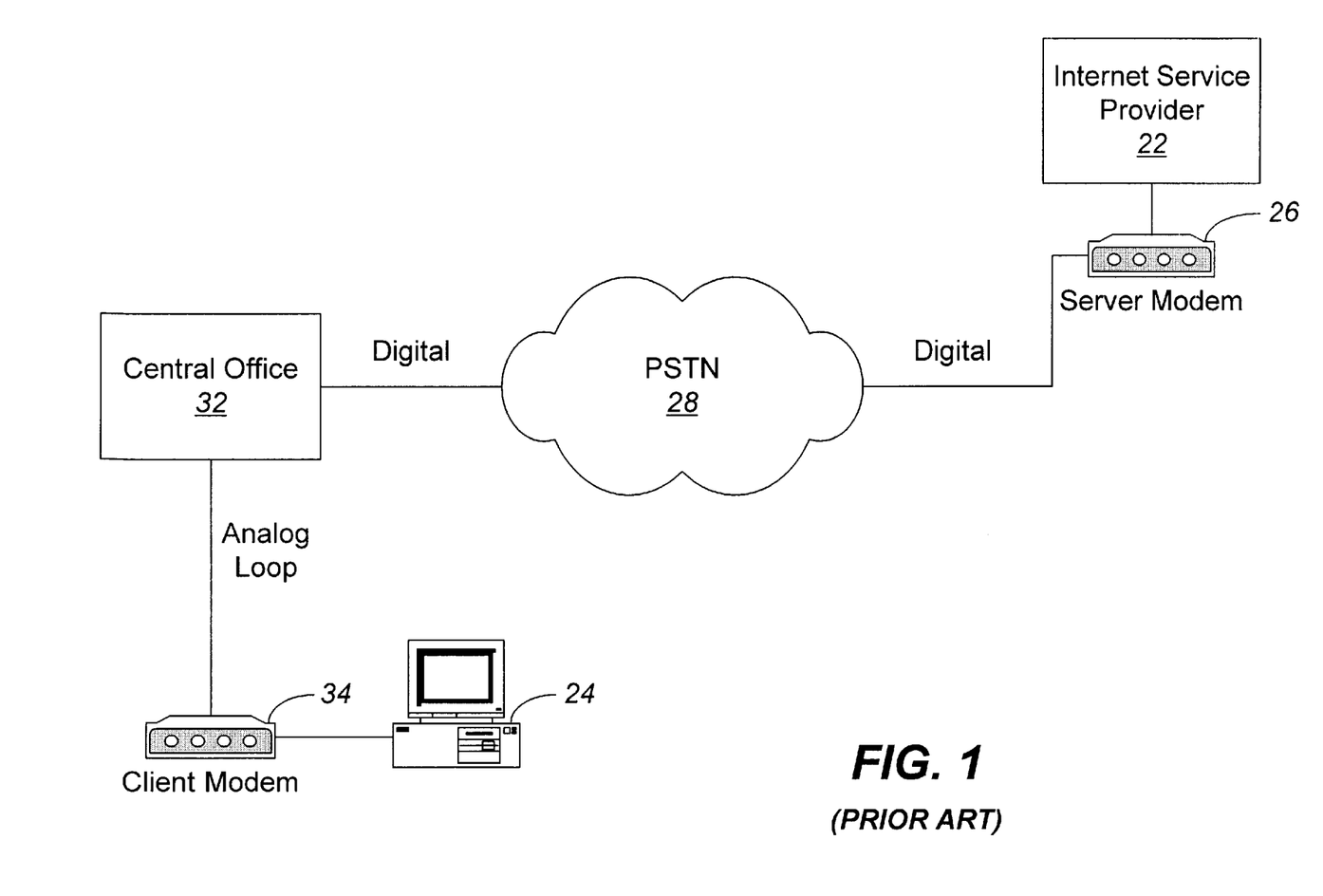
FIG. 1 is a block diagram that illustrates a typical V.90 connection between a subscriber and an ISP in accordance with the prior art.

The general environment for which the V.90 standard has been developed is depicted in FIG. 1. An Internet Service Provider (ISP) 22 is connected to a subscriber's computer 24 via a V.90 digital server modem 26, through the PSTN 28 via digital trunks (e.g., T1, E1, or ISDN Primary Rate Interface (PRI) connections), through a central office switch 32, and finally through an analog loop to the client's modem 34. The central office switch 32 is drawn outside of the PSTN 28 to better illustrate the connection of the subscriber's computer 24 and modem 34 into the PSTN 28. It should be understood that the central office 32 is, in fact, a part of the PSTN 28. The operation of a communication session between the subscriber 24 and an ISP 22 is best described with reference to the more detailed block diagram of FIG. 2.

Figure 2:
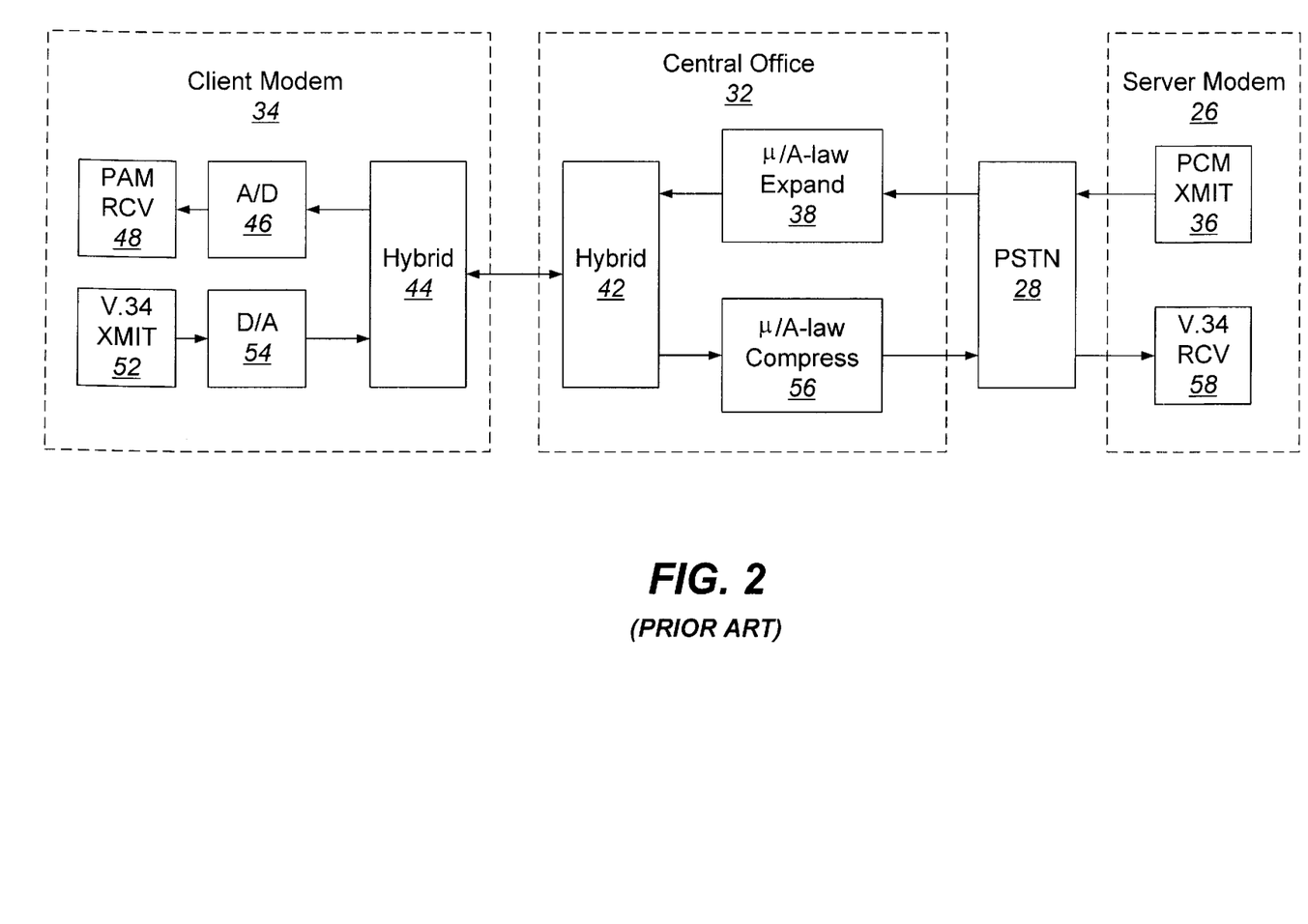
FIG. 2 is a block diagram that illustrates an internal architecture of a client modem, a central office, and a server modem shown in FIG. 1 and connections therebetween.

Transmission from the server modem 26 to the client modem 34 will be described first. The information to be transmitted is first encoded using only the 256 PCM codewords used by the digital switching and transmission equipment in the PSTN 28. These PCM codewords are transmitted towards the PSTN by the PCM transmitter 36 where they are received by a network codec. The PCM data is then transmitted through the PSTN 28 until reaching the central office 32 to which the client modem 34 is connected. Before transmitting the PCM data to the client modem 34, the data is converted from its current form as either $\mu$-law or A-law companded PCM codewords to pulse amplitude modulated (PAM) voltages by the codec expander (digital-to-analog (D/A) converter) 38. These PAM voltage levels are processed by a central office hybrid 42 where the unidirectional signal received from the codec expander 38 is transmitted towards the client modem 34 as part of a bidirectional signal. A second hybrid 44 at the subscriber's analog telephone connection converts the bidirectional signal back into a pair of unidirectional signals. Finally, the analog signal from the hybrid 44 is converted into digital PAM samples by an analog-to-digital (A/D) converter 46, which are received and decoded by the PAM receiver 48. Note that for transmission to succeed effectively at 56 kbps, there must be only a single digital-to-analog conversion and subsequent analog-to-digital conversion between the server modem 26 and the client modem 34. Recall that analog-to-digital conversions in the PSTN 28 may introduce quantization noise, which may limit the data rate as discussed hereinbefore. The A/D converter 46 at the client modem 34, however, may have a higher resolution than the A/D converters used in the analog portion of the PSTN 28 (e.g., 16 bits versus 8 bits), which results in less quantization noise. Moreover, the PAM receiver 48 needs to be in synchronization with the 8 kHz network clock to properly decode the digital PAM samples.

Transmission from the client modem 34 to the server modem 26 follows the V.34 data transmission standard. That is, the client modem 34 includes a V.34 transmitter 52 and a D/A converter 54 that encode and modulate the digital data to be sent using techniques such as quadrature amplitude modulation (QAM). The hybrid 44 converts the unidirectional signal from the digital-to-analog converter 54 into a bidirectional signal that is transmitted to the central office 32. Once the signal is received at the central office 32, the central office hybrid 42 converts the bidirectional signal into a unidirectional signal that is provided to the central office codec. This unidirectional, analog signal is converted into either $\mu$-law or A-law companded PCM codewords by the codec compressor (A/D converter) 56, which are then transmitted through the PSTN 28 until reaching the server modem 26. The server modem 26 includes a conventional V.34 receiver 58 for demodulating and decoding the data sent by the V.34 transmitter 52 in the client modem 34. Thus, data is transferred from the client modem 34 to the server modem 26 at data rates of up to 33.6 kbps as provided for in the V.34 standard.

The V.90 standard offers increased data rates (e.g., data rates up to 56 kbps) in the downstream direction from a server to a subscriber or client. Upstream communication still takes place at conventional data rates as provided for in the V.34 standard. Nevertheless, this asymmetry may be particularly well suited for Internet access. For example, when accessing the Internet, high bandwidth is most useful when downloading large text, video, and audio files to a subscriber's computer. Using V.90, these data transfers can be made at up to 56 kbps. On the other hand, traffic flow from the subscriber to an ISP consists mainly of keystroke and mouse commands, which are readily handled by the conventional rates provided by V.34.

As described above, the digital portion of the PSTN 28 transmits information using eight-bit PCM codewords at a frequency of 8000 Hz. Thus, it would appear that downstream transmission should take place at 64 kbps rather than 56 kbps as defined by the V.90 standard. While 64 kbps is a theoretical maximum, several factors prevent actual transmission rates from reaching this ideal rate. First, even though the problem of quantization error has been substantially eliminated by using PCM encoding and PAM for transmission, additional noise in the network or at the subscriber premises, such as non-linear distortion and crosstalk, may limit the maximum data rate. Furthermore, the $\mu$-law or A-law companding techniques do not use uniform PAM voltage levels for defining the PCM codewords. The PCM codewords representing very low levels of sound have PAM voltage levels spaced close together. Noisy transmission facilities may prevent these PAM voltage levels from being distinguished from one another thereby causing loss of data. Accordingly, to provide greater separation between the PAM voltages used for transmission, not all of the 256 PCM codewords are used.

It is generally known that, assuming a convolutional coding scheme, such as trellis coding, is not used, the number of symbols required to transmit a certain data rate is given by Equation 1:

$$bps = R_s \log_2 N_s \qquad \text{EQ. 1}$$

where bps is the data rate in bits per second, $R_s$ is the symbol rate, and $N_s$ is the number of symbols in the signaling alphabet or constellation. To transmit at 56 kbps using a symbol rate of 8000, Equation 1 can be rewritten to solve for the number of symbols required as set forth below in Equation 2:

$$N_s = 2^{56000/8000} = 128 \qquad \text{EQ. 2}$$

Thus, the 128 most robust codewords of the 256 available PCM codewords are chosen for transmission as part of the V.90 standard.

The V.90 standard, therefore, provides a framework for transmitting data at rates up to 56 kbps provided the network is capable of supporting the higher rates. The most notable requirement is that there can be at most one digital-to-analog conversion and subsequent analog-to-digital conversion in the path. Nevertheless, other digital impairments, such as robbed bit signaling (RBS) and digital mapping through PADs, which results in attenuated signals, may also inhibit transmission at V.90 rates. Communication channels exhibiting non-linear frequency response characteristics are yet another impediment to transmission at the V.90 rates. Moreover, these other factors may limit conventional V.90 performance to less than the 56 kbps theoretical data rate.

Because digital impairments, such as RBS and PAD, may vary from connection to connection, V.90 provides for learning the levels of the code points for the PCM codewords when a connection is established. For example, in Phase 3 of the V.90 standard, a sequence of PCM levels are sent from the server modem to the client modem. The resulting levels that are received by the client modem are used to help determine the nature of the digital portion of the telephone connection and to select appropriate code points for signal constellations used to transfer data.

During transmission and acquisition of these levels by the client modem, some levels may be corrupted by noise, non-linearities, and other impairments within the network. Large disturbances in the levels acquired by the client modem can significantly detract from the client modem capability to select appropriate code points for its signal constellations, which may lead to sub-optimum connections and possibly failure to connect in some cases.

The digital PSTN transports information using a six symbol framing structure. That is, a frame includes six data frame intervals with each data frame interval holding a single symbol. One mechanism for reducing the impact of corruption of the levels is to average levels from different intervals and then utilize the average in constellation generation. However, because of the presence if digital impairments such as robbed-bit signaling, such averaging may result in further error. Accordingly, a need exists for improvements in reducing the impact of noise, non-linearities and other impairments on constellation generation in a PCM modem.

SUMMARY OF THE INVENTION

In light of the above discussion, it is an object of the present invention to reduce the impact that noise spikes may have on the selection of code points for a modem.

It is another object of the present invention to reduce the impact of noise spikes even in the presence of digital impairments such as robbed bit signaling.

These and other objects, advantages, and features of the present invention may be provided by averaging measured levels from differing intervals and differing code points based on their proximity with other measured levels. Incorporating measured levels for more than one code point allows for increasing the number of measured levels (samples) in the average for a code point. Thus, the averaging of the present invention may take advantage of characteristics of digital impairments such as robbed-bit signaling which may collapse the measured levels of one code point onto another to increase the number of measured levels (samples) in an average. This collapsing of code point levels may be detected based on the proximity of measured levels and, thus, measured levels which are sufficiently close in proximity are averaged irrespective of the actual code point associated with the measured levels. The increase in the number of samples may further reduce the impact of noise in the measured levels on subsequent utilization of the measured levels in, for example, constellation generation and detection of digital impairments such as digital pads and robbed-bit signaling.

Such proximity averaging may be provided by methods, systems and computer program products for averaging measured levels of code point sequences from a plurality of frame intervals in the presence of robbed-bit signaling. Levels of code points from the frame intervals of different code points are evaluated to determine if they should be averaged together by comparing a first measured level of a first code point from a first of the plurality of frame intervals and a measured level of a second code point from the plurality of frame intervals. The measured level of the second code point may be identified for incorporation into an average the measured levels which includes the first code point from the plurality of frame intervals based on the comparison of the first measured level of the first code point from the first of the plurality of frame intervals and the measured level of the second code point from the plurality of frame intervals and a threshold value. After the average is determined for a code point, the measured level of the second code point may then be replaced with the average of the measured levels of the first code points if the measured level of the second code point is incorporated into the average of the measured levels of the first code point. Preferably, the first and second code points are adjacent code points in the code point sequence. This process may be repeated for each measured level for each interval and then an average computed for all measured levels to be incorporated into the average. The replacement of the measured levels may then be performed using the resulting average.

It is also preferred that the measured level of the second code point be excluded from the average of the measured levels of the second code points from the plurality of frame intervals if the measured level of the second code point is incorporated into the average of the measured levels for the first code point. By excluding the measured level of the second code point from the average of the second code point, the second code point average will not be corrupted by a measured level which has been affected by robbed-bit signaling or other digital impairments which would cause the measured level to be collapse onto the value of an adjacent code point.

The average of the measured levels of the first code point may be established by comparing the first measured level of the first code point from the first of the plurality of frame intervals with a second measured level of the first code point from a second of the plurality of frame intervals. The second measured level of the first code point is then included in the average of the measured levels for the first code point from the plurality of frame intervals based on the comparison with the first measured level and a threshold value. After determining the average, the second measured level of the first code point may be replaced with the average of the measured levels of the first code points if the second measured level of the first code point is incorporated into the average of the measured levels of the first code point. This process may be repeated for each interval of the first code point so as to determine which measured levels are within the threshold with the first measured level. Thus, measured levels from intervals from the same code point level may only be averaged if they are sufficiently close in proximity to the first measured levels, which may exclude from an average within a code point those measured levels which have been affected by robbed-bit signaling to collapse onto another code point.

In a particular embodiment of the present invention, the measured level of the second code point is incorporated into an average of the measured levels for the first code point from the plurality of frame intervals if the first comparison result indicates that a difference between the measured level of the first code point and the measured level of the second code point is less than the threshold value.

Furthermore, because of the non-linear distribution of code point levels in mu-law and A-law PCM codes the threshold value for determining if a measured level is to be included in an average may be based on the measured levels of the code point sequence. Preferably, this is accomplished by determining an average spacing for measured levels of the code point sequence consecutive with the first code point and setting the threshold value based on the determined average spacing. In particular, the average spacing may be determined based on the difference between the first measured level of the first code point and a measured level of a third code point which is four code points lower in the code point sequence than the first code point.

In a specific embodiment of the present invention, the threshold value is established based on a selected measured level of the first code point. In such a case, the comparison of the measured level of the second code point value and the measured level of the first code point value may be accomplished by comparing the measured level of the second code point to the threshold value.

In particular embodiments of the present invention, the threshold value may be established by weighting the average spacing to provide a weighted average spacing and combining the weighted average spacing and the selected measured level of the first code point to provide the threshold value. If the selected measured level of the first code point is the smallest measured level of the first code point, then the threshold value may be established by weighting the average spacing to provide a weighted average spacing and adding the weighted average spacing and the selected measured level of the first code point to provide the threshold value. In such a case, the measured level of the second code point may be compared to the threshold value by determining if the measured level of the second code point is less than or equal to the threshold value.

If the selected measured level of the first code point is the largest measured level of the first code point, then the threshold value may be established by weighting the average spacing to provide a weighted average spacing and subtracting the weighted average spacing and the selected measured level of the first code point to provide the threshold value. In such a case, the measured level of the second code point may be compared to the threshold value by determining if the measured level of the second code point is greater than or equal to the threshold value.

As will be appreciated by those of skill in the art, the present invention may be embodied as methods, systems and/or computer program products.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numbers signify like elements throughout the description of the figures.

The present invention may be embodied as systems, methods, or computer program products. Accordingly, the present invention may take the form of an entirely hardware embodiment, an entirely software (including firmware, resident software, micro-code, etc.) embodiment, or an embodiment containing both software and hardware aspects. Furthermore, the present invention may take the form of a computer program product on a computer-usable or computer-readable storage medium having computer-usable program code means embodied in the medium for use by or in connection with an instruction execution system. In the context of this document, a computer-usable or computer-readable medium may be any means that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

Computer program code for carrying out operations of the present invention may be written in a high level programming language such as C or C++. Some modules or routines, however, may be written in assembly language, machine language, or micro-code to optimize speed, memory usage, or layout of the software or firmware in memory. In a preferred embodiment, the present invention uses micro-code to implement most software programs. It should further be understood that the program code for carrying out operations of the present invention may also execute entirely on a client modem, partly on a client modem, partly on a client modem and partly on a server modem, or partly in a client modem, partly in a server modem, and partly in the PSTN. Furthermore, the program code for carrying out the present invention may execute on any processing system capable of performing the operations described herein.

Figure 3:
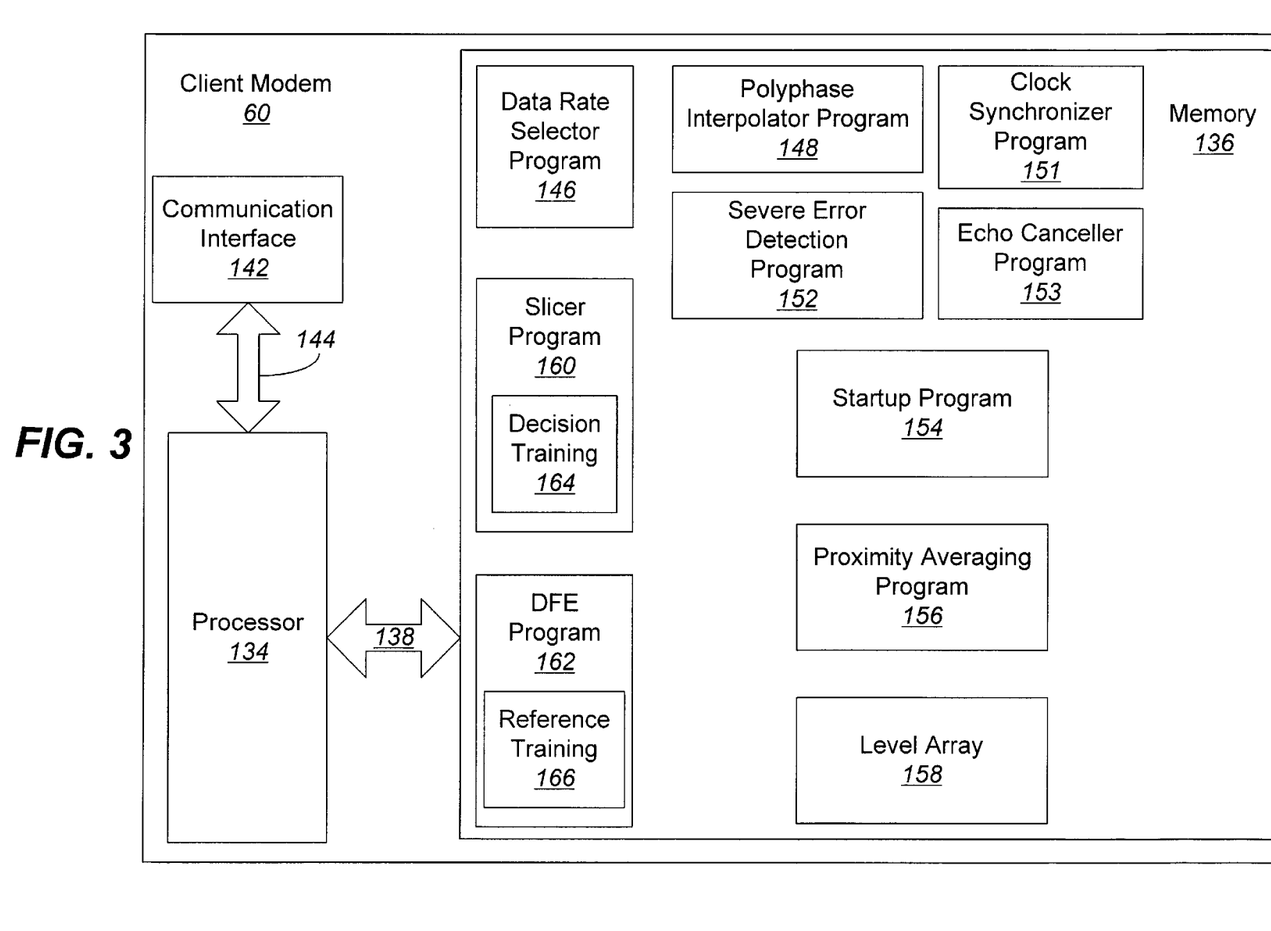
FIG. 3 is a block diagram that illustrates a client modem incorporating proximity averaging according to the present invention.

Referring now to FIG. 3, FIG. 3 illustrates a client modem 60 incorporating proximity averaging of the present invention. The client modem 60 includes a processor 134, preferably a digital signal processor, which communicates with a memory 136 via an address/data bus 138. In addition, the processor 134 may receive and transmit information to external devices via a communication interface 142, which is accessed through an input/output (I/O) bus 144. The processor 134 may be any commercially available or custom processor suitable for a real-time intensive embedded application. The memory 136 is representative of the overall hierarchy of memory devices containing the software and data used to implement the functionality of the V.90 client modem 60. The memory 136 may include, but is not limited to, the following types of devices: cache, ROM, PROM, EPROM, EEPROM, flash, SRAM, and DRAM.

As shown in FIG. 3, the memory 136 can include program modules for implementing the functionality of the components of the client modem 60. Preferably, the memory 136 can include a data rate selector program module 146, a polyphase interpolator program module 148, a clock synchronizer program module 151, a severe error detector program module 152, an echo canceller program module 153, a slicer program module 160, and a Decision Feedback Equalizer (DFE) program module 162. The slicer program module 160 and the DFE program module 162 preferably include a decision training program sub-module 164 and a reference training program sub-module 166 respectively, which are used for signaling alphabet identification. Each of these program modules and sub-modules need not be described further herein for a clear understanding of the present invention.

As shown in FIG. 3, the memory 136 includes program modules for implementing the functionality for proximity averaging according to the present invention. That is, the memory 136 preferably includes a modem startup program module 154 and a proximity averaging program module 156. Preferably, the client modem 60 also includes a level array 158 of measured, and preferably averaged, PCM code point levels which are generated by the modem startup program module 154. The modem startup program module 154 preferably carries out the startup procedures described in the ITU-T V.90 modem recommendation, including, for example, phases 1 through 4 of the startup procedure. The proximity averaging program module 156 preferably carries out the operations described below with reference to FIG. 4.

As briefly described above, during phase 3 of the V.90 startup procedure, multiple repetitions of each level of the PCM code points for each of 6 framing intervals are transmitted from the server modem to the client modem 60. The client modem acquires these levels and preferably averages multiple repetitions of the acquired levels for each of the 6 framing intervals. Preferably, the PCM code point levels are sent in a manner which avoids levels for adjacent PCM code points being sent consecutive in time so as to reduce the impact of a noise spike. These PCM code point levels may then be processed as described herein to average the measured levels across multiple frame intervals and even multiple code points so as to reduce the impact of noise and other corruption of the levels. An input array containing the measured PCM code point levels is illustrated in FIG. 3 as the level array 158. As will be appreciated by those of skill in the art, the level array 158 may be a plurality of linear arrays or may be a multidimensional array.

The present invention may, for example, be incorporated into modems 60 such as described in U.S. patent application Ser. No. 09/431,564, entitled SYSTEMS, METHODS AND COMPUTER PROGRAM PRODUCTS FOR AVERAGING LEARNED LEVELS IN THE PRESENCE OF DIGITAL IMPAIRMENTS BASED ON PATTERNS, U.S. patent application Ser. No. 09/430,694, entitled SYSTEMS, METHODS AND COMPUTER PROGRAM PRODUCTS FOR GENERATING AND OPTIMIZING SIGNAL CONSTELLATIONS, U.S. patent application Ser. No. 09/429,862 entitled SYSTEMS, METHODS AND COMPUTER PROGRAM PRODUCTS FOR IDENTIFYING DIGITAL IMPAIRMENTS IN MODEM SIGNALS USING SIGNATURE ANALYSIS AND SIGNAL LEVEL COMPARISON ANALYSIS, U.S. patent application Ser. No. 09/430,217, entitled SYSTEMS, METHODS AND COMPUTER PROGRAM PRODUCTS FOR IDENTIFYING DIGITAL IMPAIRMENTS IN MODEMS BASED ON CLUSTERS AND/OR SKIPS IN PULSE CODE MODULATION SIGNAL LEVELS, U.S. patent application Ser. No. 09/429,859, entitled SYSTEMS, METHODS AND COMPUTER PROGRAM PRODUCTS FOR IDENTIFYING DIGITAL IMPAIRMENTS TN MODEM SIGNALS, U.S. patent application Ser. No. 09/430,700, entitled SYSTEMS, METHODS AND COMPUTER PROGRAM PRODUCTS FOR CONTROLLING THE ERROR RATE IN A COMMUNICATION DEVICE BY ADJUSTING THE DISTANCE BETWEEN SIGNAL CONSTELLATION POINTS, U.S. patent application Ser. No. 09/430,697, entitled SYSTEMS, METHODS, AND COMPUTER PROGRAM PRODUCTS FOR GENERATING A DIGITAL IMPAIRMENT LEARNING SIGNAL HAVING LOW ENERGY CONTENT AT DIRECT CURRENT AND NYQUIST FREQUENCIES, U.S. patent application Ser. No. 09/430,678, entitled MODEMS HAVING A DUAL POWER MODE CAPABILITY AND METHODS OF OPERATING SANE, and U.S. patent application Ser. No. 09/430.347, entitled SYSTEMS, METHODS, AND COMPUTER PROGRAM PRODUCTS FOR CONTROLLING DATA RATE REDUCTIONS IN A COMMUNICATION DEVICE BY USING A PLURALITY OF FILTERS TO DETECT SHORT-TERM BURSTS OF ERRORS AND LONG-TERM SUSTAINABLE ERRORS, the disclosures of which are incorporated herein by reference as if set forth fully herein.

Figure 4:
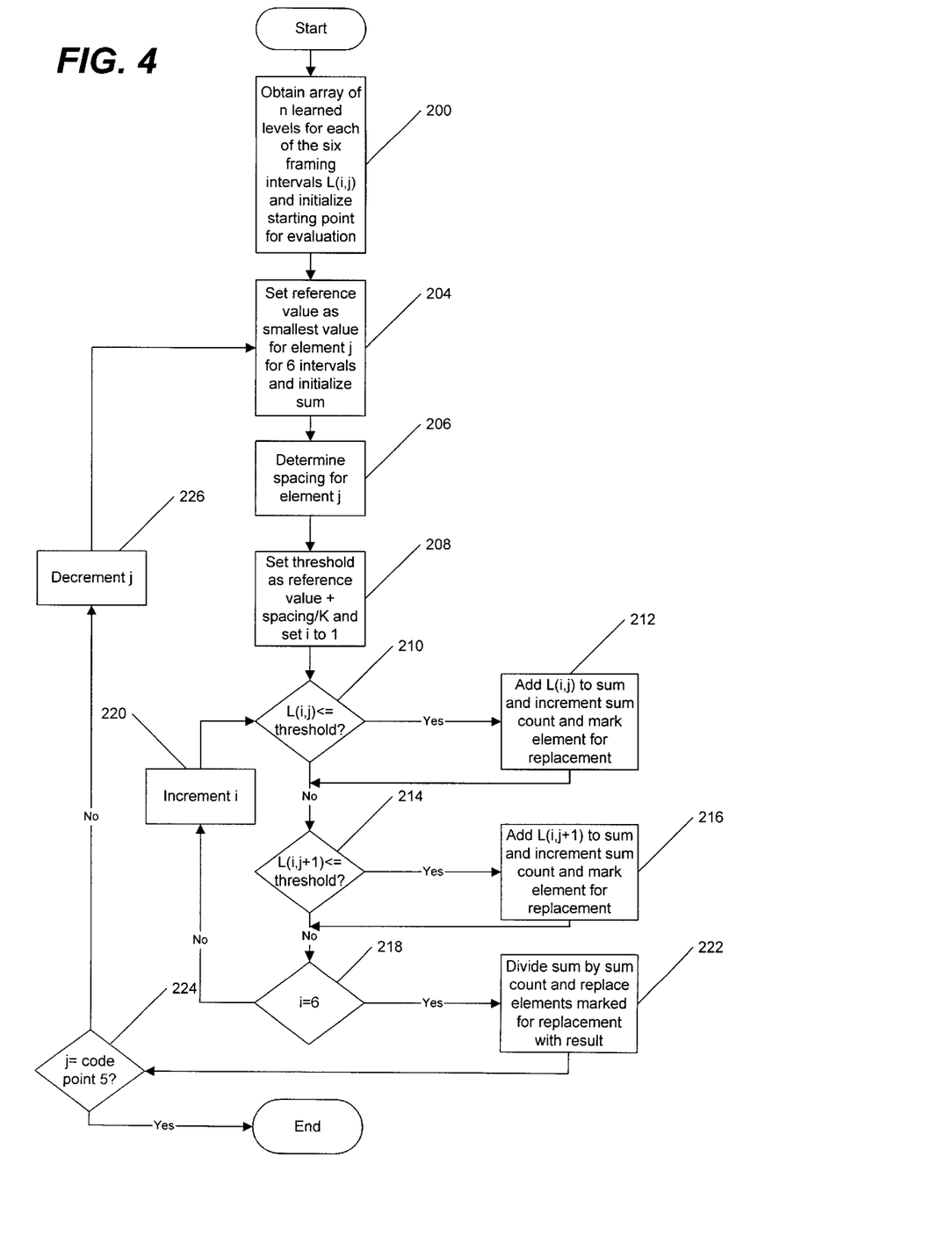
FIG. 4 is a flowchart that illustrates proximity averaging operations in accordance with the present invention.

The proximity averaging program 156 according to the present invention utilizes knowledge of the impact of digital impairments such as robbed-bit signaling on the levels of the PCM code points to increase the number of values included in the averages of levels across the framing intervals. The operations of the proximity averaging program module 156 according to a particular embodiment of the present invention are illustrated in FIG. 4 utilizing the above described PCM code point levels as the input array. Preferably, an m by n element array (L(m,n)), where n is the number of code points utilized (i.e. up to 128 for V.90) by the modem 60 and m is the number of framing intervals (e.g. six in a V.90 modem), is provided as the input array to the proximity averaging program module 156.

The present invention may allow for robbed-bit signaling which may alter one or more of the six frame intervals. For example, when simple robbed-bit signaling exists in a network connection, each frame interval affected by robbed-bit signaling may be altered such that the level associated with each odd code point is forced to the level associated with the even code point just below. The result is that for these intervals, the sequence of values will include pairs of points with the same level. The present invention takes advantage of this characteristic to increase the number of samples which can be averaged together, and thus reduce the impact of random noise on the resulting averaged levels. If an optimum averaging strategy is one which maximizes the number of samples to be averaged in order to minimize variance due to random noise, then in the presence of robbed-bit signaling the optimum averaging would result in averaging of odd code point levels for intervals affected by robbed-bit signaling with even code point levels from all 6 intervals from the previous code point. Odd code point levels for non-robbed-bit signaling intervals would be separately averaged. Thus, if k intervals have robbed-bit signaling, then there would be 6+k levels averaged with 6 levels in the average from even code points and k levels in the average from odd code points in intervals affected by robbed-bit signaling. In addition, 6−k samples may be averaged from the odd code points in intervals unaffected by robbed-bit signaling.

While such an averaging scheme may be readily implemented if noise is not present in the measured levels, if noise is present, then it may be difficult to reliably detect specific details of robbed bit signaling. Thus, the present invention provides for approximating the optimum averaging strategy without prior knowledge of which intervals have robbed-signaling and which do not. Thus, as described with reference to FIG. 4, the averaging according to the present invention is performed based on proximity of measured levels rather than knowledge of the presence or absence of robbed-bit signaling.

As seen in FIG. 4, operations according to the present invention begin by the proximity averaging program module 156 obtaining the m by n element array of learned levels for the intervals of a frame (block 200). Such an operation may be performed by accessing the Level Array 158. Preferably, the levels in the array are arranged in code point order from lowest to highest code point. The array is then evaluated code point by code point beginning with the second from the highest code point. Thus, as seen in block 200, an initial code point of interest which may be denoted by the index value j, is set to the n-1 element of the array. A reference value is then established as the smallest value of the j elements of the six intervals (i.e. MIN(L(1,j) . . . L(6,j))) (block 204). The interval corresponding to the reference value may be referred to as the r interval. Thus, the reference value would be L(r,j). The sum of the values is also set to zero (block 204) to initialize the sum for the j level and the sum count which reflects the number of values in the sum.

After establishing the reference value for the j level of the level array 158, the spacing between measured levels of code points in the array is determined (block 206). The code point spacing may be approximated by determining the average spacing between the code point of interest j and the levels of the 4 adjacent code points. Thus, the spacing between code points may be approximated by determining Spacing=(L(r,j)−L(r,j−4))/4. While the levels for the interval containing the reference level may be utilized for determining spacing, other intervals may also be utilized in determining spacing.

With the spacing determined, a decision threshold may then be determined to establish how proximate to the reference value a measured level must be to be included in an average associated with the reference value. Thus, as seen in block 208, a proximity threshold is set to Threshold=L(r,j)+(Spacing/K) where K may be a threshold weighting factor which defines how close a measured level must be to the reference value in order to be included in an average with the reference value. Preferably, K is set to 4 so that if a measured level does not deviate from the reference value by more than ¼ the spacing between levels, then the measured level is included in the average. Thus, as illustrated in FIG. 4, a threshold value is established for each code point of interest. Thus, the present invention may accommodate the non-linear spacing of code points in mu-law and A-law PCM codes. As is also illustrated in block 208, the interval index i is initialized by setting i to 1.

After establishing the threshold value for the code point of interest, the measured levels for the code point of interest are compared to the threshold (block 210). If the measured level is less than or equal to the threshold, then the measured level for L(i,j) is added to the sum and the sum count (i.e. the number of values in the sum) is incremented (block 212). The element L(i,j) is marked for replacement by the average value (block 212).

In addition to evaluating measured levels in intervals corresponding to the code point of interest j, measured levels are also evaluated for the code point higher than the code point of interest. Thus, as seen in block 214, the values for the code point higher than the code point of interest are also compared to the threshold. If the measured level is less than or equal to the threshold, then the measured level for L(i,j+1) is added to the sum and the sum count is incremented (block 216). The element L(i,j+1) is also marked for replacement by the average value (block 216).

It is then determined if the last interval for the code point of interest has been evaluated (block 218). If not, then the interval index i is incremented (block 220) and the evaluation process continues at block 210 for the next interval. If the last interval has been evaluated, then the average is determined by dividing the sum by the sum count and the elements in the level array 158 which were marked for replacement with the average are updated to replace the measured level with the average (block 222).

It is then determined if the last code point has been evaluated (block 224). If so, then the average process is complete. If not, then the code point of interest j is decremented and the next code point evaluated beginning at block 204. As seen in FIG. 4, the lowest code point to evaluate is preferably set to correspond to code point 5 so as to maintain proper spacing determination. Furthermore, code points smaller than code point 5 are typically too small to be useful in a practical modem constellation and, therefore, there may be no advantage to processing such small code points. Furthermore, as will be appreciated by those of skill in the art in light of the present disclosure, this minimum value, as well as the starting value may be modified depending on particular implementations so as to efficiently utilize processing resources. Thus, for example, if it is known a priori that code points below 10 and above 120 will not be utilized, then these unused code points could be eliminated from the averaging process. Alternatively, code points could be evaluated until the standard deviation in an average deviates too much from the average. Thus, the code points over which the present operations may be performed may also be dynamically established based on the measured levels in the code point sequence.

While a particular embodiment of the present invention has been illustrated in FIG. 4, additional embodiments of the present invention may also be provided. Thus, for example, the next lower code point (j-1) could also be included in the evaluation by incorporating operations analogous to blocks 214 and 216 and utilizing a lower threshold of the reference value minus the weighted spacing. Similarly, threshold values of L(r,j)±spacing/K could be utilized with corresponding changes to the comparisons of blocks 210 and 214.

Furthermore, while the present invention has been described with reference to utilization of the smallest measured level as the reference value, the largest measured level may also be utilized in determining the threshold value. Thus, block 204 may be modified to recite that the reference value is the largest value for the six intervals. A threshold may then be set based on the largest value minus the weighted spacing. Such a setting of the threshold value may be reflected in FIG. 4 by modifying block 208 to recite that the threshold is the reference value minus the weighted spacing. The values utilized in the averages may then be only those levels which are greater than or equal to the threshold value. Therefore, blocks 210 and 214 would be modified to reflect the greater than or equal to comparison. Otherwise, the operations illustrated in FIG. 4 may be carried out as described above. Furthermore, use of the smallest and largest measured levels may be successively carried out to increase the number of elements in the level array 158 which are included in an average.

In a still further embodiment of the present invention, cases where multiple distinct levels are represented in intervals of a frame could be identified. Thresholds for each distinct level could then be identified and the current code point and adjacent code points evaluated using the threshold for the distinct level.

As can be seen from the above description of one embodiment of the present invention, in one embodiment of the present invention, the averages do not include levels which do not fall within the threshold of any reference value. Thus, it is preferred that the measured levels in the level array 158 be glitch filtered so as to remove such anomalous values from the level array 158 prior to use of the proximity averaging according to the present invention. One such suitable glitch filter is described in commonly assigned and co-pending U.S. patent application Ser. No. 09/1432,023, entitled SYSTEMS, METHODS AND COMPUTER PROGRAM PRODUCTS FOR FILTERING GLITCHES FROM MEASURED VALUES IN A SEQUENCE OF CODE POINTS, the disclosure of which is incorporated herein by reference as if set forth fully herein. As will be appreciated by those of skill in the art in light of the present disclosure, it may be advantageous to coordinate the value of K with the threshold value of the glitch filter so as to minimize or eliminate anomalous values which will not be included in any average.

In any event, if a measured level deviates too much from the reference value, this measured level may be excluded from all averages. Furthermore, if the reference value is the deviating value, such may be determined by post processing analysis of the resulting array to determine which elements were not updated with an average value or by tracking the number of interval levels in the averages and then re-evaluating those averages with fewer than a threshold value to select a different reference value for the code point and then to re-evaluate the code point levels in the different intervals.

In one embodiment of the present invention, proximity averaging may be implemented in assembly language code. The assembly language code may take the form of the following code.

```
__padmode__neg equ *
r4=systmp0                              ;point to V90 data
r1=#1
r7=UMAX(r4)                             ;largest ucode;
padmode(r4)=r1      r7=r7-r1            ;set new pad mode for next time
__learnedlvl__avg__loop equ *
;***********************************************************************
; First, find largest level for this ucode, and set a decision threshold
;***********************************************************************
r0=&(digimp__data+Learned__lvl__0+2)(r4)    ;ptr to beginning of learned level
        r0=r0+r7                        ;do it twice for byte addressing
        r0=r0+r7                        ;point to largest DIL level in 1st interval
        %wr2                            ;init accumulator
r5=0*(MTRN1D+NDILMAX)(r0)               ;interval 0 DIL level
r6=2*(MTRN1D+NDILMAX)(r0)               ;interval 1 DIL level
        r5=|r5| min |r6|                ;Use smaller of two levels
r6=4*(MTRN1D+NDILMAX)(r0)               ;interval 2 DIL level
        r5=|r5| min |r6|                ;Use smaller of two levels
r6=6*(MTRN1D+NDILMAX)(r0)               ;interval 3 DIL level
        r5=|r5| min |r6|                ;Use smaller of two levels
r6=8*(MTRN1D+NDILMAX)(r0)               ;interval 4 DIL level
        r5=|r5| min |r6|                ;Use smaller of two levels
r6=10*(MTRN1D+NDILMAX)(r0)       ;interval 5 DIL level
        r5=|r5| min |r6|                ;Use smaller of two levels
r3=0*(MTRN1D+NDILMAX)(r0)               ;r3=current level;
r6=-8+0*(MTRN1D+NDILMAX)(r0)            ;level 4 ucodes lower
r6=#128     r3=r3-r6        ;difference between two levels 4 positions apart
                                        ;r6 used to incr # of intervals averaged
        r3=r3/16                        ;/4 for avg spacing;/4 for threshold
r1=#6       r5=r5+r3        ;threshold for including in average
;***********************************************************************
; Now, find all points at this ucode and the one below which match threshold
;***********************************************************************
__learnedlvl__avg__loop1 equ *
rpl=0*(MTRN1D+NDILMAX)(r0)              ;level in current interval
        r5-rpl                          ;test against threshold
bn *+4      r3=r3^~r3                   ;if smaller, skip
r6l=0*(MTRN1D+NDILMAX)(r0)              ;level in current interval
;-----------------------------------------------------------------------
0*(MTRN1D+NDILMAX)(r0)=r3               ;flag with -1 for later update
        wr2=wr2+wr6                     ;accumulate average and count
rpl=(+2+0*(MTRN1D+NDILMAX))(r0)         ;next higher level in interval
        r5-rpl                          ;test against threshold
bn *+4      r1=r1+r3                    ;if smaller, skip; decr lp cnt
r6l=(+2+0*(MTRN1D+NDILMAX))(r0)         ;next higher level in interval
;-----------------------------------------------------------------------
        flags lock
        wr2=wr2+wr6                     ;accumulate average and count
        flags unlock,nogen
(+2+0*(MTRN1D+NDILMAX))(r0)=r3          ;flag with -1 for later update
r0=&2*(MTRN1D+NDILMAX)(r0)              ;incr ptr;
bp__learnedlvl__avg__loop1 r3=r2        ;repeat for each interval
        r3=r3/64                        ;r3=2*# of points in average
;-----------------------------------------------------------------------
        r5=r2l                          ;need for fixup if only 1 point averaged
r1=#1       %r6                         ;used to get r2l into rpl
r1=#-4      r1*r5                       ;offset to skip 0 or 1 points
r5=#0x003f      r1=r1+r3                ;adjust # of points for indexing
bn__skip_average__II    r2=r2&r5        ;mask off count in high byte
r3=#-1      r4=r4+r1                    ; r0=ptr->correct divisor location
;-----------------------------------------------------------------------
;***********************************************************************
; Now, calculate average by multiplyig by the reciprocal of the # of points used
;***********************************************************************
r6=r2l                                  ; r6=lower 16bit of the sum(wr2)
r5=Nonrbs__divby(r4)        ; r5=divisor=2^16*1/#nonrbsintrvl found
        r5|*|r6                         ; lower 16bit of sum * divisor (r5*r2l)
wr6=rp                                  ; store the product
    tnop    r5|*|r2                     ; upper 16 bit of sum*divisor (r5*r2)
__skip_average__II equ *
        r6=r6+rpl                       ; r6=wr2*r5=sum/#nonrbs interval
        r6=r6+rd                        ; rounding product, r6=final average
;***********************************************************************
; Now, put average in each point which contributed to it
;***********************************************************************
r2=#6       r4=r4-r1                    ; restore r4 to base of v90 data segment
__learnedlvl__avg__loop2 equ *
r5=-2*(MTRN1D+NDILMAX)(r0)              ;level in current interval
r1=#5       r5-r3                       ;test for flag (-1)
```

-continued

```
bne *+3                                   ;if smaller, skip
r5=(+2-2*(MTRN1D+NDILMAX))(r0)            ;next higher level in current interval
;------------------------------------------------------------------------
-2*(MTRN1D+NDILMAX)(r0)=r6                ;update current interval with average
r0=&-2*(MTRN1D+NDILMAX)(r0) r5-r3         ;incr ptr; test lower level for flag (-1)
bne *+3         r2=r2+r3                  ;if smaller, skip; decr loop count
        nop
;------------------------------------------------------------------------
(+2+0*(MTRN1D+NDILMAX))(r0)=r6            ;update next higher interval with average
bp_learnedlvl_avg_loop2 r7-r1             ;repeat for each interval; r1=5
        nop
;------------------------------------------------------------------------
bp_learnedlvl_avg_loop                    ;repeat for each ucode >=5
        r7=r7+r3                          ;decr outer loop count (current ucode)
;************************************************************************
; END: PADMODE===-1 : DIL level averaging prior to IPS
; when done with outer loop, fall through to exit
; Note: padmode set to 1 before starting the loop.
;************************************************************************
```

The present invention has been described herein with reference to flowchart and/or block diagram illustrations of methods, apparatus (systems), and computer program products according to an embodiment of the invention. It will be understood that each block of the flowchart and/or block diagram illustrations, and combinations of blocks in the flowchart and/or block diagram illustrations, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-usable or computer-readable memory that can direct a computer or other programmable data processing apparatus to function in a particular manner, such that the instructions stored in the computer-usable or computer-readable memory produce an article of manufacture including instruction means that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

The flowchart of FIG. 4 illustrates the architecture, functionality, and operation of a possible implementation of the client modem receiver software. In this regard, each block represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

While the present invention has been illustrated and described in detail in the drawings and foregoing description, it is understood that the embodiments shown are merely exemplary. Moreover, it is understood that many variations and modifications can be made to the embodiments described hereinabove without substantially departing from the principles of the present invention. All such variations and modifications are intended to be included herein within the scope of the present invention, as set forth in the following claims.

What is claimed is:

1. A method of averaging measured levels of code point sequences from a plurality of frame intervals, the method comprising the steps of:

comparing a first measured level of a first code point from a first of the plurality of frame intervals and a measured level of a second code point from the plurality of frame intervals;

responsive to a difference between the measured level of the first code point and the measured level of the second code point being less than a threshold value, incorporating the measured level of the second code point into an average of the measured levels for the first code point from the plurality of frame intervals; and replacing the measured level of the second code point with the average of the measured levels of the first code point if the measured level of the second code point is incorporated into the average of the measured levels of the first code point.

2. A method according to claim 1, wherein the steps of comparing, and incorporating are carded out for each frame interval in the second code point so as to evaluate each of the measured levels of the second code point and wherein the step of replacing is carried out after each of the measured levels of the second code point are evaluated.

3. A method according to claim 1, further comprising the step of excluding the measured level of the second code point from the average of the measured levels of the second code points from the plurality of frame intervals if the measured level of the second code point is incorporated into the average of the measured levels for the first code point.

4. A method according to claim 1, further comprising the steps of:

comparing the first measured level of the first code point from the first of the plurality of frame intervals and a second measured level of the first code point from a second of the plurality of frame intervals;

incorporating the second measured level of the first code point into the average of the measured levels for the first code point from the plurality of frame intervals based on the comparison of the first measured level of the first code point from the first of the plurality of frame intervals and the second measured level of the first code point from the second of the plurality of frame intervals and a threshold value; and replacing the second measured level of the first code point with the average of the measured levels of the first code points if the second measured level of the first code point is incorporated into the average of the measured levels of the first code point.

5. A method according to claim 4, wherein the steps of comparing the first measured level of the first code point from the first of the plurality of frame intervals and a second measured level of the first code point from a second of the plurality of frame intervals, incorporating the second measured level of the first code point into the average of the measured levels for the first code point from the plurality of frame intervals based on the comparison of the first measured level of the first code point from the first of the plurality of frame intervals and the second measured level of the first code point from the second of the plurality of frame intervals and a threshold value and replacing the second measured level of the first code point with the average of the measured levels of the first code points if the second measured level of the first code point is incorporated into the average of the measured levels of the first code point are carried out for each frame interval in the first code point other than the first of the plurality of frame intervals.

6. A method according to claim 4, wherein the steps of comparing a first measured level of a first code point from a first of the plurality of frame intervals and a measured level of a second code point from the plurality of frame intervals and the step of incorporating the measured level of the second code point into an average of the measured levels for the first code point from the plurality of frame intervals based on the comparison of the first measured level of a first code point from the first of the plurality of frame intervals and the measured level of a second code point from the plurality of frame intervals and a threshold value are carried out for each frame interval in the second code point so as to evaluate each of the measured levels of the second code point and wherein the step of replacing the measured level of the second code point and the step of replacing the measured level of the first code point are carried after each of the measured levels of the second code point and the measured levels of the first code point are evaluated.

7. A method according to claim 1, further comprising the step of determining the threshold value based on the measured levels of the code point sequence.

8. A method according to claim 7, wherein the step of determining the threshold value based on the measured levels of the code point sequence comprises the steps of:

determining an average spacing for measured levels of the code point sequence consecutive with the first code point; and setting the threshold value based on the determined average spacing.

9. A method according to claim 8, wherein the average spacing is determined based on the difference between the first measured level of the first code point and a measured level of a third code point which is four code points lower in the code point sequence than the first code point.

10. A method according to claim 8, further comprising the step of:

establishing the threshold value based on the first measured level of the first code point; and wherein the comparing step comprises the step of comparing the measured level of the second code point to the threshold value.

11. A method according to claim 10, wherein the step of establishing the threshold value based on the first measured level of the first code point comprises the steps of:

weighting the average spacing to provide a weighted average spacing; and combining the weighted average spacing and the first measured level of the first code point to provide the threshold value.

12. A method according to claim 10, wherein the first measured level of the first code point comprises the smallest measured level of the first code point.

13. A method according to claim 12, wherein the step of establishing the threshold value based on the first measured level of the first code point comprises the steps of:

weighting the average spacing to provide a weighted average spacing; and adding the weighted average spacing and the first measured level of the first code point to provide the threshold value.

14. A method according to claim 13, wherein the step of comparing the measured level of the second code point to the threshold value comprises the step of determining if the measured level of the second code point is less than or equal to the threshold value.

15. A method according to claim 10, wherein the first measured level of the first code point comprises the largest measured level of the first code point.

16. A method according to claim 15, wherein the step of establishing the threshold value based on the first measured level of the first code point comprises the steps of:

weighting the average spacing to provide a weighted average spacing; and subtracting the weighted average spacing from the first measured level of the first code point to provide the threshold value.

17. A method according to claim 16, wherein the step of comparing the measured level of the second code point to the threshold value comprises the step of determining if the measured level of the second code point is greater than or equal to the threshold value.

18. A method according to claim 1, wherein the first and second code points are adjacent code points in the code point sequence.

19. A system for averaging measured levels of code point sequences from a plurality of He intervals, the system comprising:

means for comparing a first measured level of a first code point from a first of the plurality of frame intervals and a measured level of a second code point from the plurality of frame intervals;

means, responsive to the means for comparing, for incorporating the measured level of the second code point into an average of the measured levels for the first code point from the plurality of frame intervals when a difference between the first measured level of the first code point and the measured level of the second code point is less than a threshold value; and means for replacing the measured level of the second code point with the average of the measured levels of the first code points if the measured level of the second code point is incorporated into the average of the measured levels of the first code point.

20. A system according to claim 19, wherein the means for comparing comprises means for comparing a first measured level of a first code point from a first of the plurality of frame intervals and each of the measured levels of a second code point from the plurality of frame intervals.

21. A system according to claim 19, further comprising means for excluding the measured level of the second code point from the average of the measured levels of the second code points from the plurality of frame intervals if the measured level of the second code point is incorporated into the average of the measured levels for the first code point.

22. A system according to claim 19, further comprising:
means for comparing a first measured level of a first code point from a first of the plurality of frame intervals and a second measured level of the first code point from a second of the plurality of frame intervals;
means for incorporating the second measured level of the first code point into the average of the measured levels for the first code point from the plurality of frame intervals based on the comparison of the first measured level of the first code point from the first of the plurality of frame intervals and the second measured level of the first code point from the second of the plurality of frame intervals and a threshold value; and
means for replacing the second measured level of the first code point with the average of the measured levels of the first code points if the second measured level of the first code point is incorporated into the average of the measured levels of the first code point.

23. A system according to claim 22, wherein the means for comparing comprises means for comparing a first measured level of a first code point from a first of the plurality of frame intervals and each of the measured levels of the first code point from the plurality of frame intervals other than the first of the plurality of frame intervals.

24. A system according to claim 19, further comprising means for determining the threshold value based on the measured levels of the code point sequence.

25. A system according to claim 24, wherein the means for determining the threshold value based on the measured levels of the code point sequence comprises:
means for determining an average spacing for measured levels of the code point sequence consecutive with the first code point; and
means for setting the threshold value based on the determined average spacing.

26. A system according to claim 25, wherein the average spacing is determined based on the difference between the first measured level of the first code point and a measured level of a third code point which is four code points lower in the code point sequence than the first code point.

27. A system according to claim 25, further comprising:
means for establishing the threshold value based on the first measured level of the first code point; and
wherein the means for comparing comprises means for comparing the measured level of the second code point to the threshold value.

28. A system according to claim 27, wherein the means for establishing the threshold value based on the first measured level of the first code point comprises:
means for weighting the average spacing to provide a weighted average spacing; and
means for combining the weighted average spacing and the first measured level of the first code point to provide the threshold value.

29. A system according to claim 27, wherein the first measured level of the first code point comprises the smallest measured level of the first code point.

30. A system according to claim 29, wherein the means for establishing the threshold value based on the first measured level of the first code point comprises:
means for weighting the average spacing to provide a weighted average spacing; and
means for adding the weighted average spacing and the first measured leveld of the first code point to provide the threshold value.

31. A system according to claim 30, wherein the means for comparing the measured level of the second code point to the threshold value comprises means for determining if the measured level of the second code point is less than or equal to the threshold value.

32. A system according to claim 27, wherein the first measured level of the first code point comprises the largest measured level of the first code point.

33. A system according to claim 32, wherein the means for establishing the threshold value based on the first measured level of the first code point comprises:
means for weighting the average spacing to provide a weighted average spacing; and
means for subtracting the weighted average spacing and the first measured level of the first code point to provide the threshold value.

34. A system according to claim 33, wherein the means for comparing the measured level of the second code point to the threshold value comprises means for determining if the measured level of the second code point is greater than or equal to the threshold value.

35. A system according to claim 19, wherein the first and second code points are adjacent code points in the code point sequence.

36. A computer program product for averaging measured levels of code point sequences from a plurality of frame intervals, the computer program product comprising:
a computer-readable storage medium having computer readable program code embodied in said medium said computer-readable program code comprising:
computer-readable program code for comparing a first measured level of a first code point from a first of the plurality of frame intervals and a measured level of a second code point from the plurality of fame intervals;
computer-readable program code, responsive to the computer-readable program code for comparing, for incorporating the measured level of the second code point into an average of the measured levels for the first code point from the plurality of frame intervals when a difference between the measured level of the first code point and the measured level of the second code point is less than a threshold value; and
computer-readable program code for replacing the measured level of the second code point with the average of the measured levels of the first code points If the measured level of the second code point is incorporated into the average of the measured levels of the first code point.

37. A computer program product according to claim 36, wherein the computer-readable program code for comparing comprises computer-readable program code for comparing a first measured level of a first code point from a first of the plurality of frame intervals and a measured level of each of the frame intervals of a second code point.

38. A computer program product according to claim 36, further comprising computer-readable program code for excluding the measured level of the second code point from the average of the measured levels of the second code points from the plurality of frame intervals if the measured level of the second code point is incorporated into the average of the measured levels for the first code point.

39. A computer program product according to claim 38, wherein the first and second code points are adjacent code points in the code point sequence.

40. A computer program product according to claim 36, further comprising:

computer-readable program code for comparing a first measured level of the first code point from the first of the plurality of frame intervals and a second measured level of the first code point from a second of the plurality of frame intervals;

computer-readable program code for incorporating the second measured level of the first code point into the average of the measured levels for the first code point from the plurality of frame intervals based on the comparison of the first measured level of the first code point from the first of the plurality of frame intervals and the second measured level of the first code point from the second of the plurality of frame intervals and a threshold value; and computer-readable program code for replacing the second measured level of the first code point with the average of the measured levels of the first code points if the second measured level of the first code point is incorporated into the average of the measured levels of the first code point.

41. A computer program product according to claim 40, wherein the computer-readable program code for comparing comprises computer-readable program code for comparing a first measured level of the first code point from the first of the plurality of frame intervals and each of the measured levels of the first code point other than the first of the plurality of frame intervals.

42. A computer program product according to claim 36, further comprising computer-readable program code for determining the threshold value based on the measured levels of the code point sequence.

43. A computer program product according to claim 42, wherein the computer-readable program code for determining the threshold value based on the measured levels of the code point sequence comprises:

computer-readable program code for determining an average spacing for measured levels of the code point sequence consecutive with the first code point; and computer-readable program code for setting the threshold value based on the determined average spacing.

44. A computer program product according to claim 43, wherein the average spacing is determined based on the difference between the first measured level of the first code point and a measured level of a third code point which is four code points lower in the code point sequence than the first code point.

45. A computer program product according to claim 43, further comprising:

computer-readable program code for establishing the threshold value based on the first measured level of the first code point; and wherein the computer-readable program code for comparing comprises computer-readable program code for comparing the measured level of the second code point to the threshold value.

46. A computer program product according to claim 45, wherein the computer-readable readable program code for establishing the threshold value based on the first measured level of the first code point comprises:

computer-readable program code for weighting the average spacing to provide a weighted average spacing; and computer-readable program code for combining the weighted average spacing and the first measured level of the first code point to provide the threshold value.

47. A computer program product according claim 45, wherein the first measured level of the first code point comprises the smallest measured level of the first code point.

48. A computer program product according to claim 47, wherein the computer-readable program code for establishing the threshold value based on the first measured level of the first code point comprises:

computer-readable program code for weighting the average spacing to provide a weighted average spacing; and computer-readable program code for adding the weighted average spacing and the first measured level of the first code point to provide the threshold value.

49. A computer program product according to claim 48, wherein the computer-readable program code for comparing the measured level of the second code point to the threshold value comprises computer-readable program code for determining if the measured level of the second code point is less than or equal to the threshold value.

50. A computer program product according to claim 45, wherein the first measured level of the first code point comprises the largest measured level of the first code point.

51. A computer program product according to claim 50, wherein the computer-readable program code for establishing the threshold value based on the first measured level of the first code point comprises:

computer-readable program code for weighting the average spacing to provide a weighted average spacing; and computer-readable program code for subtracting the weighted average spacing and the first measured level of the first code point to provide the threshold value.

52. A computer program product according to claim 51, wherein the computer-readable program code for comparing the measured level of the second code point to the threshold value comprises computer-readable program code for determining if the measured level of the second code point is greater than or equal to the threshold value.

* * * * *